April 9, 1940. W. WATSON 2,196,618
X-RAY APPARATUS
Filed Sept. 7, 1939 5 Sheets-Sheet 2

INVENTOR
WILLIAM WATSON
BY
ATTORNEY

April 9, 1940.   W. WATSON   2,196,618
X-RAY APPARATUS
Filed Sept. 7, 1939   5 Sheets-Sheet 3
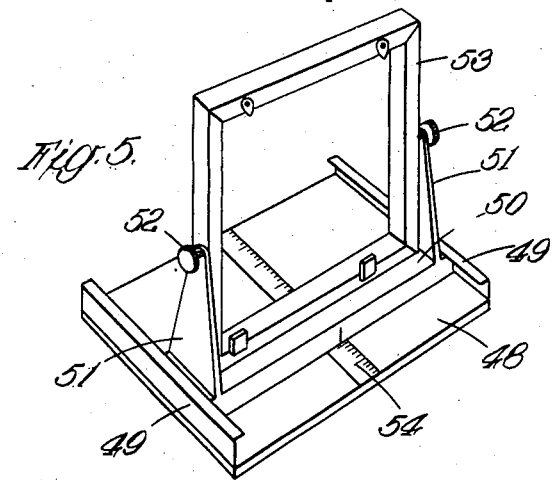
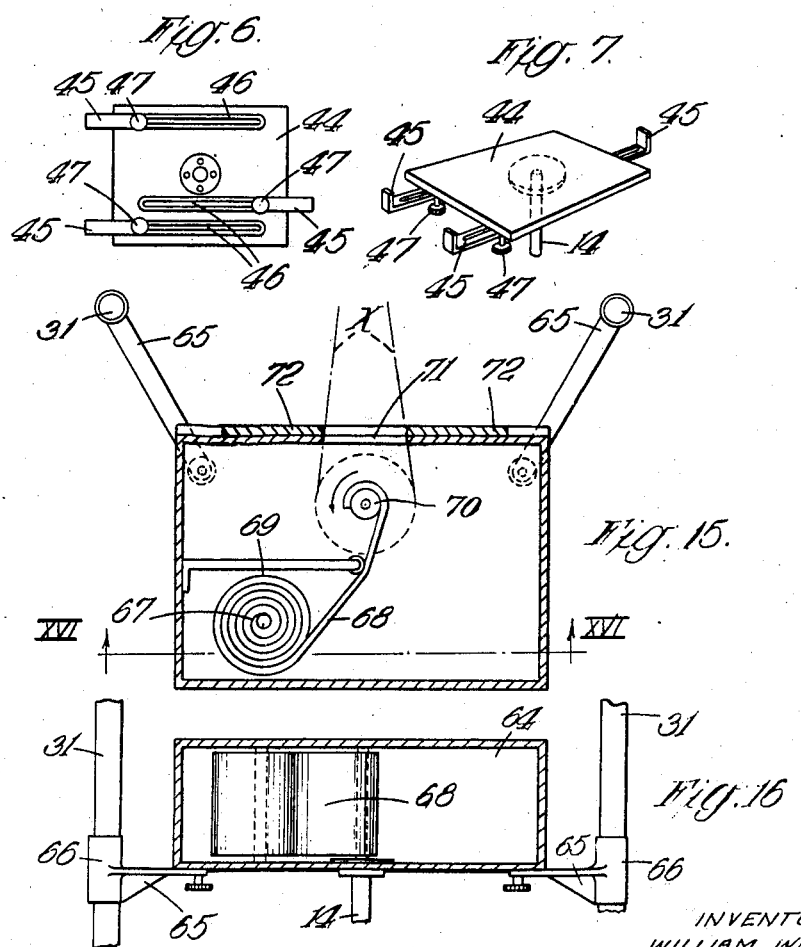
INVENTOR
WILLIAM WATSON
ATTORNEY April 9, 1940. W. WATSON 2,196,618
X-RAY APPARATUS
Filed Sept. 7, 1939 5 Sheets—Sheet 4

INVENTOR
WILLIAM WATSON
BY J W Greenhow
ATTORNEY

April 9, 1940.  W. WATSON  2,196,618
X-RAY APPARATUS
Filed Sept. 7, 1939   5 Sheets—Sheet 5
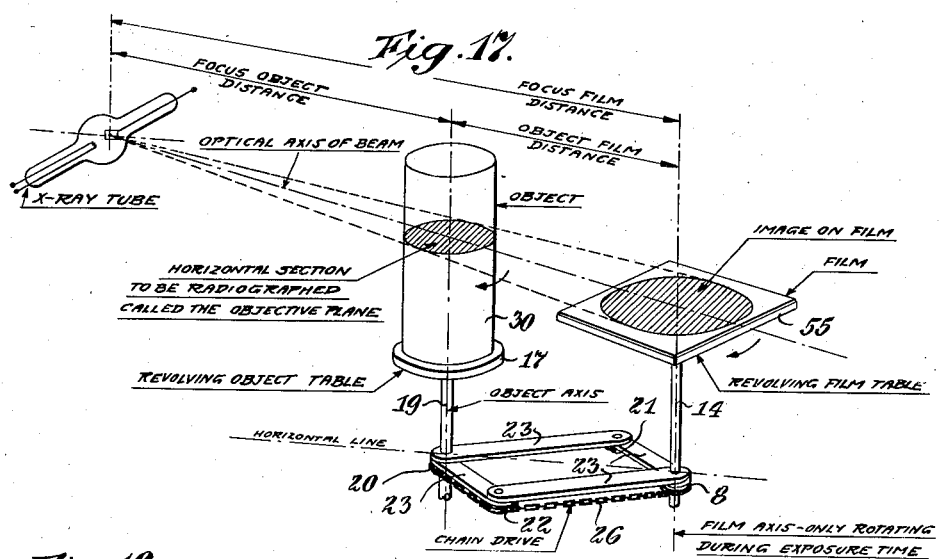
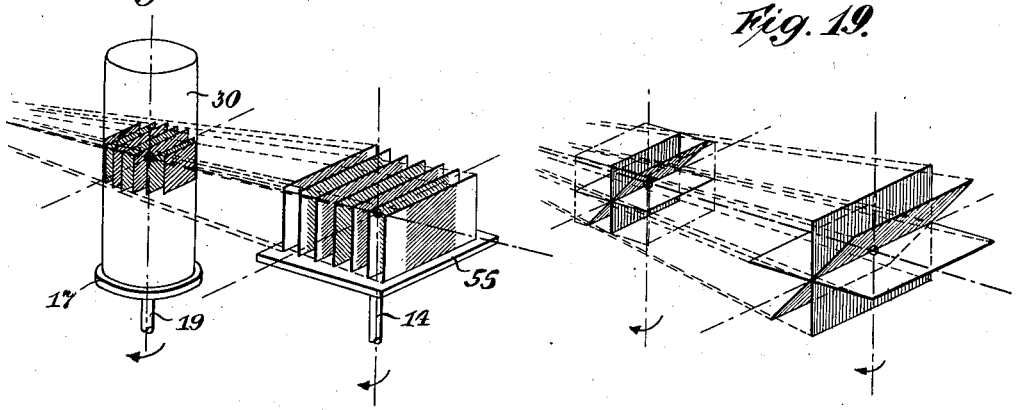
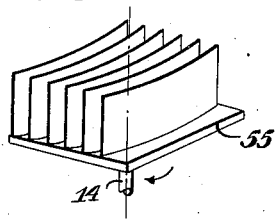 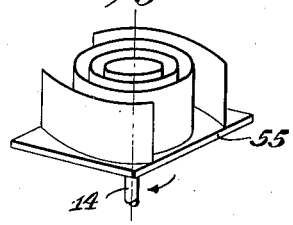 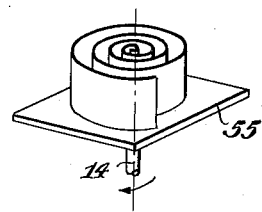
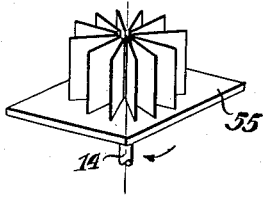 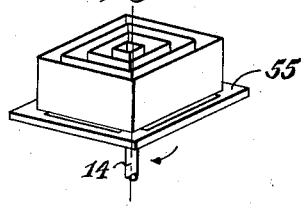
INVENTOR
WILLIAM WATSON.
BY
ATTORNEY Patented Apr. 9, 1940

2,196,618

UNITED STATES PATENT OFFICE 2,196,618

X-RAY APPARATUS

William Watson, London, England, assignor to The Medical Supply Association Limited, London, England, an association of Great Britain Application September 7, 1939, Serial No. 293,720
In Great Britain December 29, 1937

8 Claims. (Cl. 250—61.5)

This invention relates to X-ray apparatus and more particularly to apparatus which may be employed for so-called differential radiography. Differential radiography is distinguished from normal radiography by the fact that the resultant radiographs are substantially true representations of matters lying in a preselected plane of the irradiated object, matters lying in redundant planes, i. e. planes not selected, being blurred or otherwise distorted.

Apparatus for differential radiography has been proposed in several forms, amongst which there is "Tomograph" apparatus. In this latter apparatus, in order to secure the desired image of a preselected plane in the irradiated object, the X-ray tube is moved relatively to the object during exposure of the film and the latter is moved in correspondence with the source of X-rays to secure the selective recording of a particular plane of the irradiated object.

It is the chief object of the invention to afford apparatus of the type generally indicated above, but which will afford better results, or results of better diagnostic value, whilst essentially simplifying the nature of the apparatus required.

In accordance with the present invention, there is provided apparatus for use in conjunction with an X-ray tube to secure a recording of a particular plane, or planes, or section, or sections, through an object or patient to undergo irradiation, wherein the source of X-rays, the means for supporting the object or patient and the recording means are all arranged in such manner that a preselected plane or planes (section or sections) of the object my be irradiated and an image or images thereof produced on the recording means, the latter being adapted for angular movement up to or beyond 360° and either the body undergoing irradiation or the source of the X-rays being similarly adapted for performing a like angular movement, the angular movement of the recording means and the irradiated body or the tube being so co-ordinated that during such angular movement the image, or images, of the preselected plane or planes (or section or sections) of the object or body upon the recording means remains stationary relatively to said recording means.

In order that the said invention may be clearly understood and readily carried into effect, the same will now be more fully described with reference to the accompanying drawings, in which Figure 1 is a side view, partly in section, of a part of an apparatus for carrying out the invention, Figures 2, 3 and 4 are respectively side, plan and inverted plan views of the apparatus, certain parts being omitted for clarity.

Fig. 5 is a perspective view of a support for a film holder or cassette which may be employed with the present apparatus for the making of a radiograph of a single section or plane of an object;

Fig. 6 is a bottom view of a platform attachable to the apparatus for securing the support of Fig. 5 to the apparatus;

Fig. 7 is a perspective view of the top of the platform as shown in Fig. 6;

Figure 8:
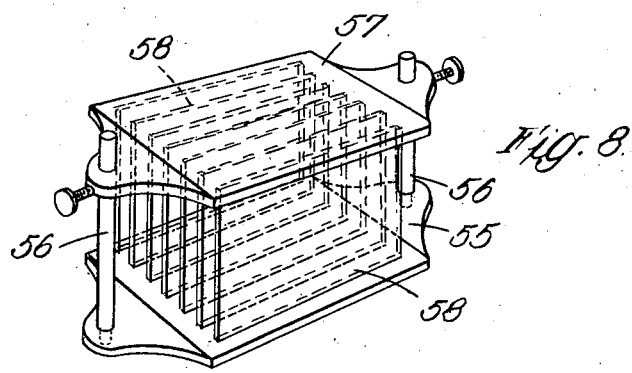
Fig. 8 is a perspective view of a modification of the support as shown in Fig. 6 for supporting a plurality of films to enable several sections or planes of an object to be simultaneously radiographed.

Figs. 9 to 13, inclusive, are sectional views showing various other modifications which the support such as shown in Fig. 8 may take, such views being taken on a sectional line midway between the top and bottom plates as shown, for example, in Fig. 8;

Fig. 14 is an elevational view of a grid such as may be employed with the present invention having part of the structure broken away to better illustrate the mechanism;

Fig. 15 is a sectional view looking down on a further modification of a film support which may be employed in connection with the present invention;

Fig. 16 is a sectional view taken on the line XVI—XVI of Fig. 15;

Fig. 17 is a diagrammatic illustration of the apparatus of the present invention for the taking of a radiograph of a single horizontal section or plane of an object;

Fig. 18 is a diagrammatical illustration of the apparatus of the present invention for the taking of a radiograph of a plurality of vertical sections or planes of an object simultaneously when employing a film holder such as shown in Fig. 8;

Fig. 19 is a further diagrammatical illustration showing various angular positions of the film for the taking of a section or plane of the object to be radiographed parallel to the plane of the film, and Figs. 20 to 24, inclusive, are perspective views to diagrammatically illustrate the positions of the sensitized films when disposed in the respective supports as shown in Figs. 9 to 13, inclusive.

Referring first to Figures 1 to 4, the apparatus generally consists of a base member 1, which is hollow to allow mechanism to be located therebeneath. The base member 1 has a slot 2 over which there is seated a column 3. The base of the column 3 enters the slot 2 and is guided therein. There is a hand adjusting mechanism 4 whereby the column 3 may be clamped in any position of adjustment along the slot 2. The column is hollow and receives a hollow shaft 5, the lower end 6 of which has a spigot 7 screwed into it, such spigot projecting through the slot 2 and carrying fixedly a sprocket wheel 8. There is a thrust bearing 9 arranged to permit the hollow shaft 5 to be turned with ease with reference to the column 3 even though there may be a vertical load upon the said hollow shaft. Within the hollow of the shaft 5 there is accommodated a tube 10, the adjusted position of which, in a vertical direction, is controlled by a locking screw 11. The tube 10 in turn houses a further tube 12, the vertically adjusted position of which is controlled by the screw clamp 13. The tube 12 is adapted at its upper end to receive a spigot 14 attached to a table 15. The spigot 14 may be clamped by the hand-adjusting screw 16.

In addition to the column 3, the base plate 1 also carries a turntable 17. The latter is supported through a ball-race 18 and there is a central shaft 19 secured to the movable member 17 of the turntable. The shaft 19 passes through the base plate 1 and carries at its lower end fixedly a sprocket wheel 20 which will be seen to be in alignment with the sprocket 8 associated with the column 3. In addition to the sprockets 20 and 8, there are two further sprockets 21 and 22 which are shown in the inverted plan view of Figure 4. There are rigid links 23 extending between the shafts 7 and 19, such links loosely engaging the shafts so as not to interfere with the angular movement thereof. The links 23 also engage short spindles 24 and 25 which support the sprockets 21 and 22. There is an endless chain 26 engaging all the sprockets 8, 19, 21 and 22.

The turntable 17 on its upper side has a pair of vertical supports 27 and 28 which, at their upper ends, are joined by a horizontal bar 29. There is a semi-cylindrical screen or support 30 arranged in conjunction with the frame-work consisting of the members 27, 28 and 29. With the apparatus so far described, it will be understood that if the system of telescopic supporting tubes within the column 3 is moved angularly, then the sprocket 8 associated therewith will be similarly angularly moved and the chain 26 will cause the turntable 17 to move in like manner. If it is desired to adjust the position of the column 3 along the slot 2, this may be done by slackening off the screw clamping mechanism 4 and pushing the column 3 towards the desired position of adjustment. The links 23 will serve always to keep the chain 26 taut, so that any angular movement of the telescopic supporting system within the column 3 will always result in a corresponding angular movement of the turntable and vice versa. The telescopic system of tubes carried by the column 3 is intended to support a cassette or film carrier which may be designed in various ways as will be explained with reference to the other figures of the drawings. For the purpose of describing the action of the apparatus of Figures 1 to 4, it will be assumed that the simple table shown in Figure 1 at 15 receives a cassette adapted to hold an exposed film in a horizontal plane. Then, to complete the illustrated apparatus and to render it operable, an X-ray tube of known construction and type is disposed behind the turntable 17 in such manner as to produce an X-ray beam that passes over the turntable and is directed upon the horizontal film within the cassette carried by the table 15, such as shown in Fig. 17. There is a grid carrier 31 disposed between the column 3 and the turntable 17. The grid carrier 31 consists of two parallel spaced uprights which are braced as at 32 at their lower ends, and which serve to support between them the grid 33 (see Figure 14). The grid 33 is carried in a frame 34 which is supported on pivots 35 connected with a further frame 36. The frame 36 is in turn supported by pivots 37 which are secured to sliders 38 which work upon the uprights of the supporting structure 31. The supporting uprights 31 are provided with cable and pulley mechanism associated with counterweights whereby the grid may be readily adjusted in a vertical direction on its supports. It will be understood that with the disposal of the grid 33 in the way described, the latter may be moved to any convenient angle of adjustment so as to secure always the optimum effect of the grid.

Figure 1:
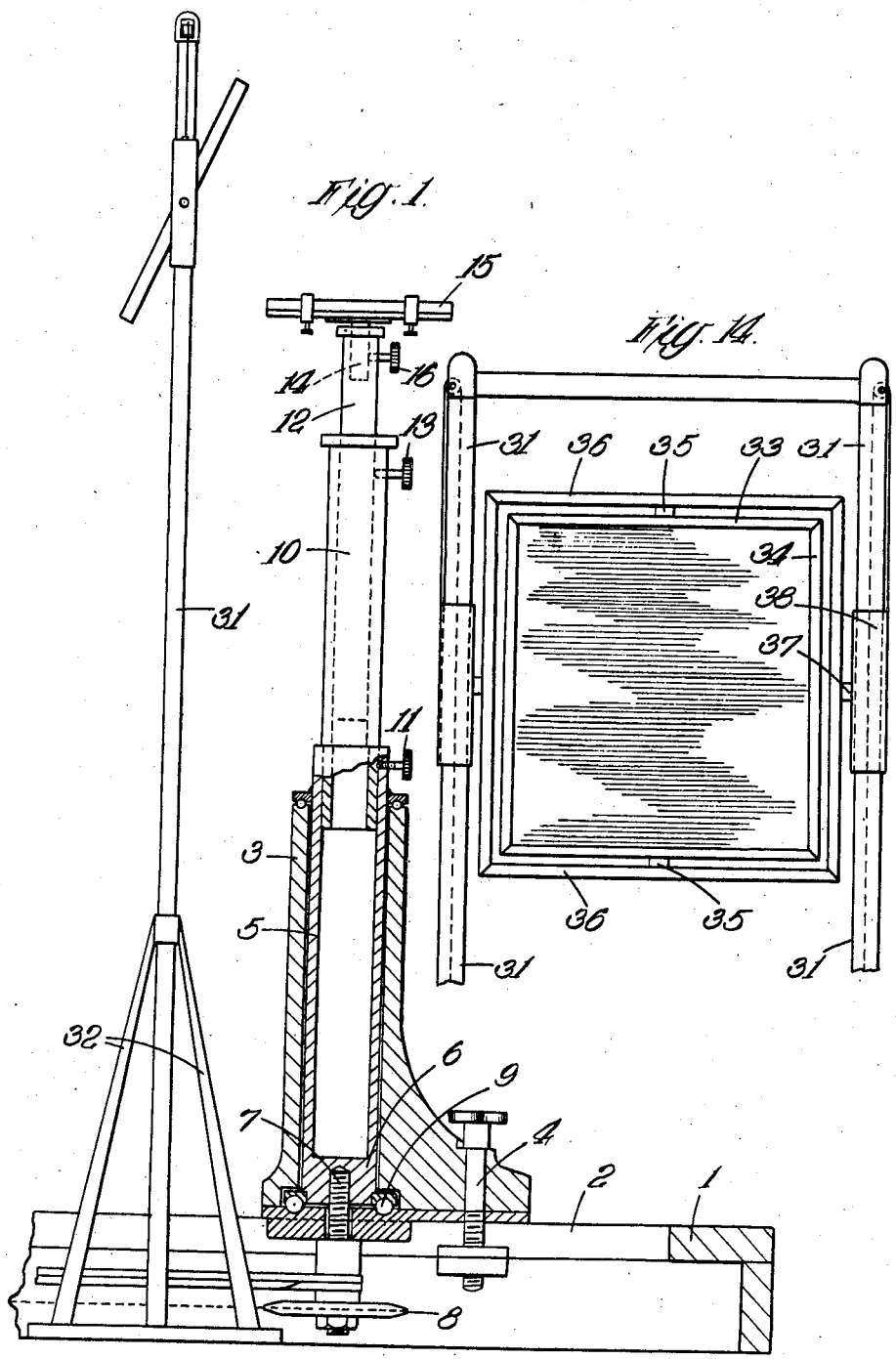
Figure 2:
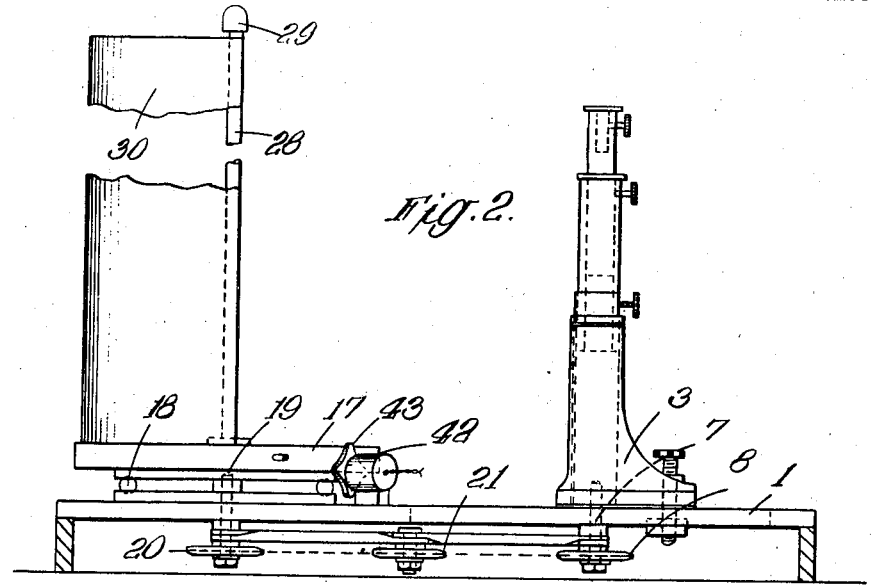

With the grid disposed in the manner indicated, and positioned for example in the way shown in Figure 1, the X-ray tube causes a beam of X-rays to pass over the top of the turntable 17 and to pass through the grid and to irradiate the film supported by the table 15. In describing the intended use of the apparatus, it will be supposed that a patient is standing upon the turntable 17 or is supported by a saddle seat thereon (not shown). The beam of X-rays will pass obliquely through the body of the patient carried by the turntable 17 and a corresponding shadow in a horizontal plane will fall upon the horizontally supported film as can be seen in the diagrammatic illustration of Fig. 17. If now the turntable 17 be rotated so that the patient thereon is subject to an angular movement, then similarly the film carried by the platform 15 will be subject to a similar angular movement and there will be recorded upon the film a record of a horizontal section through the patient at a particularly vertical height. Upon the film there will also be recorded in a distorted or blurred manner other parts than that which it is specifically desired to record. It will, however, be understood that only one preselected horizontal plane will be recorded upon the film in a clear and distinct manner. Such plane may be varied by varying horizontal height of the platform 15 carrying the film and also the angle of the incident beam of X-rays. Thus a sectional picture along a horizontal plane through any desired portion of the patient's body may be secured.

It will be further seen from Fig. 17 that the film axis and object axis remain parallel to each other at all times. Also to project an image upon the film of a horizontal plane of the object, the optical axis of the X-ray beam must be above the level of the film so that the X-ray beam will have a downward direction. The height of the objective plane is always at the level where the optical axis of the X-ray beam intersects the object axis. The optical axis of the X-ray beam is a line joining the focus to the intersection of the film by its own axis as can be seen in Fig. 17. Raising the X-ray tube and the film a similar amount raises the height of the objective plane equally. A variation in the height of the film only or varying the object-film distance alters the height of the objective plane. An alteration in the angle of projection also alters the height of the objective plane.

From Fig. 17 it will also be obvious that the objective plane can be automatically selected by proper adjustment of the parts of the apparatus as above noted and will always be parallel to the film and have a similar relation to the object axis as the film has to the film axis. Moreover, it can be appreciated from Fig. 17 that the magnification of the image as compared to the object remains constant so long as the focus-object distance and the object-film distance remain constant and even though the focal-film distance varies perpendicular relative to the film, or the angle of projection is altered, provided the objective plane is parallel to the film. Thus to change the magnification factor of the image it is only necessary to alter either the focus-object or the object-film distance.

Figure 3:
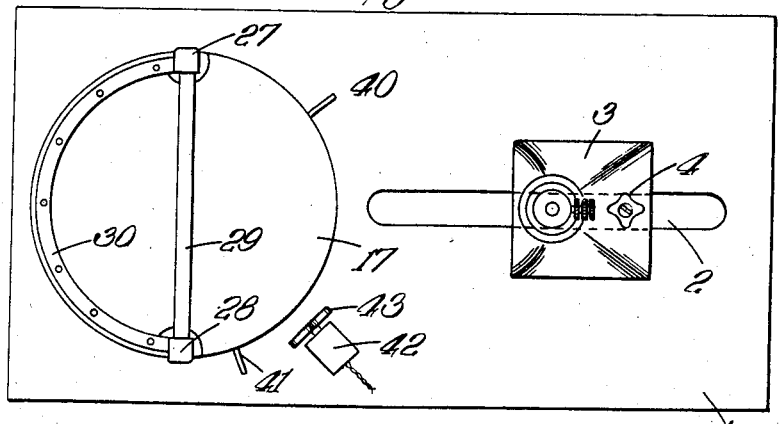
Figure 4:
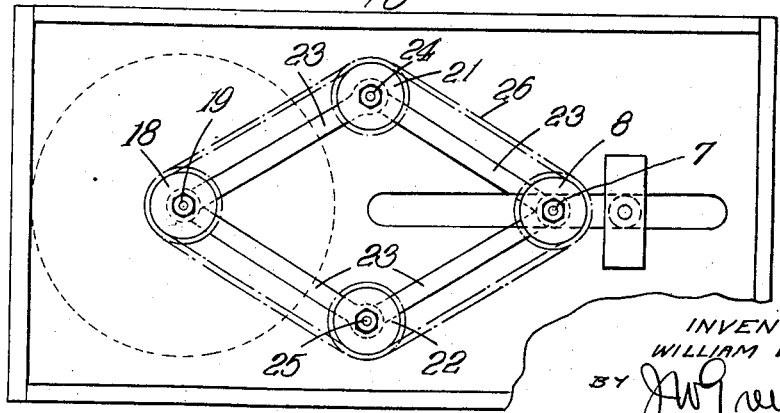

In the drawings no means has been illustrated for turning the turntable 17. It will, however, be understood that the turning movement may be obtained by hand or, alternatively, by means of an automatic drive from an electric motor. The angular distance through which the turntable is rotated may be varied according to technical requirements and depending upon the nature of the body that is being irradiated by the X-rays. Thus, if for example a metal casting is being examined and not the body of a patient, it may be desirable to set the turntable and the platform carrying the film into rotation over a considerable angular distance of as much as 360 degrees. On the other hand, a rotation through only a short angular distance of about 180 degrees may be desired. In the case where a short angular distance of exposure of the film is desired, the turntable 17 may be formed with a plurality of radially disposed apertures into which there may fit pegs 40 and 41. There is an electric switch 42 located adjacent the turntable 17 and provided with an operating star member 43 with which the pins 40 and 41 may co-operate. The electric switch 42 serves to control the X-ray tube so that if, for example, the turntable is rotating in anti-clockwise direction, as seen in Figure 3, then the arrangement would be such that when the pin 40 is behind the switch 42, with reference to the intended direction of movement of the turntable, then on the initial movement of the pin 40 it will co-act with the switch 42 to bring the X-ray tube into operation, such tube remaining in operation until the peg 41 passes the switch 42, whereupon the member 43 will again be operated to cut off the source of X-rays.

In the above, reference has been made particularly to the making of horizontal sectional radiographs. It will be realised that the apparatus described is not limited to this use. The table or platform 15 may carry a vertically disposed cassette supporting a film in a vertical plane, such as shown in Fig. 6. The beam of X-rays will now be arranged so as to pass through the grid 33 and to irradiate the film and the patient, or object, upon the turntable with a beam that is substantially perpendicular to the vertical film. If the film is located in a vertical plane containing the axis of rotation of the table 15, then a section through the patient consisting of a vertical plane including the axis of rotation of the turntable would be recorded. The image will thus be perspectively the same as that seen by the naked eye from the position of the focus, but if the optical axis of the X-ray beam is not perpendicular to the film, then the image exhibits distortion in depth only with that portion or section of the object parallel to the film true to shape from any point of a hemisphere at which it is practicable to place the focus. It is, however, not necessary to dispose the film in a vertical plane containing the axis of rotation of the turntable. If the film is disposed in a vertical plane a predetermined distance from the axis of rotation of the carrier 15, then a corresponding plane located a predetermined distance, according to the magnification factor, from the axis of the turntable 17 will be recorded as hereinafter more fully described with reference to Fig. 5. In the following, several types of film holders will be described to show the several methods of operation of the apparatus. It will, however, be understood that the examples of construction of the various types of film holders have by no means been exhausted and other possibilities arise. There is first the type of platform generally shown in Figures 1 and 15, and more particularly shown in Figures 6 and 7. The platform consists of a base member 44 having the spigot 14 and brackets 45. The brackets 45 have elongated fixing slots 46 adapted for co-operation with screw clamps 47, whereby an adjustment may be made for the reception of various sizes of cassette. The platform described is suitable for the reception of a horizontally disposed cassette and film.

In Figure 5 there is shown a type of platform for support of a vertical film holder. There is a base member 48 provided with a spigot (not shown) and having channel section ends 49. The channel section ends 49 permit a framework to be slid therein and brought to various positions of adjustment. The framework essentially consists of a base member 50 having uprights 51 which carry pivot screws 52 for the support of a rectangular frame 53. The frame 53 is adapted to receive a cassette or film holder (or an equivalent screen, which remark applies where a film is mentioned herein for obvious reasons). There may be an arbitrary scale 54 adapted to co-operate with the film holder for the purpose of allowing determination of the relative, or absolute distance of recorded sections. It will be understood that the film carried in this holder may be located in a vertical plane either on the vertical axis or any distance from the centre of rotation of the supporting table as above noted and, furthermore, the film may be obliquely placed if so desired. In other words the film may be positioned in any angular position, such as shown in Fig. 19, and regardless of the angulation of the X-ray beam, that portion of the object parallel to the film will be well defined with all other portions distorted. Also, since the relation of the film to the axis of rotation is immaterial for recording a sharp image, it follows that the film need not be parallel to the axis of rotation, but the film may be oblique or at right angles to the axis. Furthermore, the film need not be flat; it can be curved or bent to any reasonable shape. Also, a number of films in any desired spacial relation may be simultaneously exposed, each film recording a different section of the object, or a continuous length of film may be used to record a continuous spiral section of increasing depth.

In Figure 8 there is shown a holder adapted to receive a plurality of recording films. There is a base member 55 having a pair of uprights 56 secured thereto. There is an upper member 57 similar to the lower member 55, both members having grooves 58. Between a corresponding pair of grooves 58 there is supported the film or like recording means, whereby a plurality of films may be supported parallel to one another at predetermined distances apart. With the employment of the film holder shown in Figure 8, it will be understood by reference to Fig. 18 that several film records may be made at the same time, each such record representing a particular section through the patient or object at distances apart corresponding to the spacing of the films (depending on the appropriate magnification factor). Inasmuch as some of the films (Fig. 18) are in front of the film axis or axis of rotation of the support 55, while one may be on the axis and others are behind such axis, each film selects a different image corresponding to an objective plane located parallel to the respective film and located a distance from the object axis similar to the film from the film axis.

Figure 9:
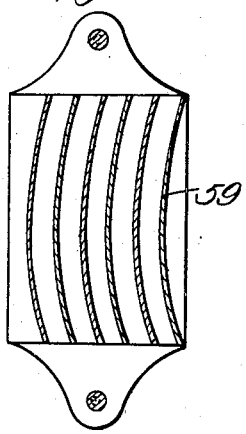
Figure 10:
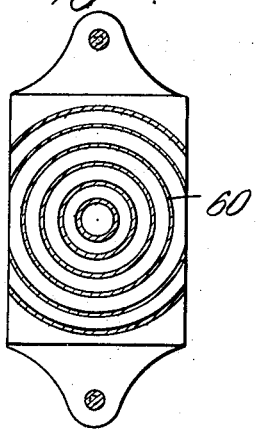
Figure 11:
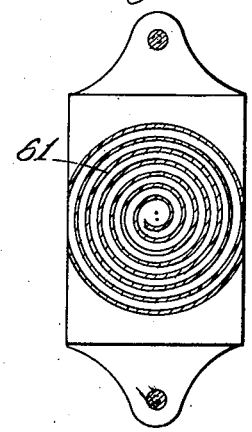
Figure 12:
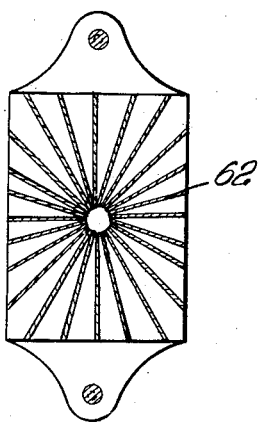
Figure 13:
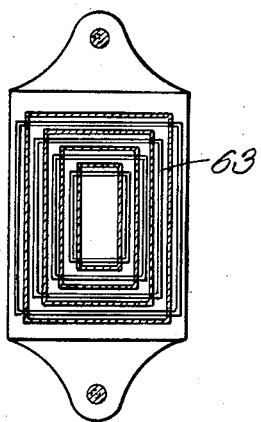

In Figures 9 and 20 there is indicated apparatus similar to that shown in Figures 8 and 18 except that the grooves for the support of the films are curved as indicated at 59, whereby a plurality of sectional records are obtained along a curved surface with the image representing a section of the object having the same curvature as the film or films. In Figures 10 and 21 the grooves 60 are made concentric and circular so that a plurality of cylindrical sectional pictures are obtained. In Figures 11 and 22 the groove 61 is made of spiral shape so as to obtain a corresponding record. Figures 13 and 24 indicate the possibility of employing rectangular grooves 63 and Figures 12 and 23 radially disposed grooves 62. Obviously, however, in the construction of Figs. 13 and 24, all of the grooves 63 cannot be occupied in any one instance.

Figures 15 and 16 show a modification in the apparatus where it is contemplated that the film should only be progressively exposed to radiation for the purpose of recording that section of the object or patient which it is desired to record thereon. A light-tight box 64 is employed and is supported upon the spigot 14. As an additional support there are two arms 65 which carry sleeves 66 engaging the uprights 31 of the structure for supporting the grid. Within the light-tight box there is a spool 67 carrying film 68. The spool is located behind a vertical screening wall 69 made of a material that does not permit X-rays to pass therethrough. It may, for example, be leaded. There is a second spool 70 secured to a shaft constituting an extension of the spigot 14. The front side of the light-tight box is formed with an aperture 71 which is controlled by shutters 72 of material that does not permit X-rays to pass therethrough. The shutters 72 may be adjusted towards and away from one another so as to reduce or increase the effective size of the aperture 71. For reasons which will be understood hereafter, it is desirable to have the shutters 72 in order that the contrast in the film records may be adjusted. In this case, preferably the film is leaded or otherwise made impermeable to X-rays on that surface opposite the surface intended to be irradiated by the X-ray beam. The film may be rendered impermeable by the aid of lead foil in a manner known per se. In any case, the film bears a spacing means along one side, so that when it is rolled from the spool the layers of light sensitive material upon the film are spaced from one another by more than the actual thickness of the film.

The spigot 14 associated with the light-tight box 64 does not, of course, in this case serve to rotate the box. It is free thereof, whereby the spigot 14 may cause rotation of the spool 70 without altering the position of the light-tight box. A beam of X-rays indicated at X in Figure 15 is allowed to fall upon the spool 70. The spool 67 is loaded with the film 68. With rotation of the spigot 14 in the direction indicated by the arrow in Figure 15, the film will be wound on the spool 70 whilst it is exposed on its sensitive side to the X-ray radiation. By the use of this type of film carrier, it is possible to obtain a sharp record of a spiral section through the patient or object undergoing irradiation.

It will now be understood how various types of records may be made in using the invention and how yet further modifications might be set forth. Moreover, while it is possible with the present invention to radiograph plane sections and curved sections simply by disposing the films in a preselected maner corresponding to the section of the object desired, for the sake of simplicity such will be referred to in the appended claims as "parallel planes" or "plane parallel", although in cases of curved sections this is naturaly not geometrically correct even though the sections will have the same curvature.

In the above described apparatus, it will be noted that the source of X-rays shown diagrammatically in Fig. 17 may consist of an X-ray tube mounting of standard construction, the X-ray tube being adjusted to a required position and then allowed to remain in its position of adjustment during the exposure of the film or the like. It will be appreciated from first principles that instead of rotating the patient or object undergoing irradiation the X-ray tube might itself be moved in correspondence with the movement of the film. A construction of apparatus where movement of the source of X-rays is achieved is not described in detail for the reason that, in most cases, the X-ray tube and its mounting will necessarily be of considerable mass, and it will not, in general be convenient for practical reasons to move the source of X-rays except where small tubes are concerned. Moreover, since X-ray tubes may be of delicate construction, the swinging movement thereof is from this aspect undesirable. However, in general, to satisfy the conditions of the invention, it will suffice if the source of X-rays, the object or patient irradiated, and the recording means, viz. the film, are so relatively disposed that the film is moved and the object or patient undergoing irradiation or the source of X-rays is moved in correspondence so that there is a particular preselected plane or planes (section or sections) irradiated which remain stationary with reference to the recording means. It will thus become obvious to those skilled in the art that an apparatus is herein provided for differential radiography wherein a radiograph of a single object-plane or section of any preselected angulation may be made or a plurality of object-planes simultaneously made. Moreover, continuous rotary motion is applied to the object and film axes which are permanently vertically parallel to each other. Simply by positioning the film in any angular plane from the vertical to the horizontal and whether on the film-axis or spaced therefrom, any desired object-plane or planes may be automatically radiographed with excellent definition. Also, a grid for the suppression of secondary radiations can be readily employed with the apparatus of the present invention, regardless of the angle of the film relative to the object axis.

Although several modifications of the present invention have been herein shown and described, it is to be understood that other embodiments of the present invention may be made without departing from the spirit and scope of the appended claims.

What I claim is:

1. The method of radiographing a particular plane of simultaneously a plurality of sections of an object which consists in synchronously rotating the object to be radiographed and the image recorder about parallel vertical axes, subjecting the object and image recorder to a beam of X-rays, the optical axis of which intersects the parallel axes of rotation of the object and image recorder, and positioning the image recorder in a "plane parallel" to the preselected plane or sections of the object it is desired to radiograph.

2. The method of radiographing a particular plane or simultaneously a plurality of sections of an object which consists in rotating the object to be radiographed about a vertical axis, rotating the image recorder about a vertical axis parallel to that of the object and in a horizontal plane below the object plane, subjecting the object and image recorder to an angular beam of X-rays having its focal point above the plane of the object and in line with the image recorder and the optical axis of which intersects the parallel axes of rotation of the object and image recorder, and positioning the image recorder in a "plane parallel" to the preselected plane or sections of the object it is desired to radiograph.

3. An X-ray apparatus for producing radiographs of a particular plane or simultaneously of a plurality of sections of an object comprising a source of X-rays, supporting means for the object to be radiographed disposed adjacent said source of X-rays and rotatable about a vertical axis, an image recorder disposed adjacent said object support on the side thereof opposite from said source of X-rays and rotatable about a vertical axis parallel to that of said object support, said image recorder being adapted to preselect the desired plane or sections of the object to be radiographed by positioning the recorder in a "plane parallel" to that of the section desired, and means operable to simultaneously rotate said object support and said image recorder with their rotation being so coordinated that an image of the preselected plane or sections of said object is cast by the source of X-rays on said recorder by intersection of the optical axis of said source of X-rays with the parallel axes of rotation of said object support and said recorder, which image remains stationary relative to the rotating recorder.

4. An X-ray apparatus for producing radiographs of a particular plane or simultaneously of a plurality of sections of an object comprising a source of X-rays, supporting means for the object to be radiographed disposed adjacent said source of X-rays and rotatable about an axis to present a preselected plane or sections of said object to the optical axis of said source of X-rays, a carrier for an image recorder disposed adjacent said object on the side thereof opposite from said source of X-rays and rotatable about an axis parallel to the axis of said object support, said image recorder being adapted to preselect the desired plane or sections of the object to be radiographed by positioning the same in a "plane parallel" to that of the section desired, and means operable to cause synchronous rotary movement of said object support and said carrier while the object is subjected to said source of X-rays, the optical axis of which intersects the parallel axes of rotation of said object support and said recorder to produce an image on said recorder of a preselected plane or sections of the object, which image remains stationary relative to the rotating recorder.

5. An X-ray apparatus for producing radiographs of a particular plane or simultaneously of a plurality of sections of an object comprising a source of X-rays, supporting means for the object to be radiographed disposed adjacent said source of X-rays for positioning the object in a plane below that of said source of X-rays and rotatable about an axis to present a preselected plane or sections of said object to the source of X-rays, a carrier for an image recorder disposed adjacent said object on the side thereof opposite from said source of X-rays in a plane below that of the object to be radiographed and rotatable about an axis parallel to the axis of said object support, and means operable to cause synchronous rotary movement of said supporting means and said carrier while the object is subjected to a beam of X-rays from said source projecting angularly through the plane of said object and said recorder and intersecting the axes of rotation thereof to produce an image on said recorder of a preselected plane or sections of the object, which image remains stationary relative to the rotating recorder.

6. An X-ray apparatus for producing radiographs of a particular plane or simultaneously of a plurality of sections of an object comprising a source of X-rays, supporting means for the object to be radiographed disposed adjacent said source of X-rays and rotatable about a vertical axis, an image recorder disposed adjacent said object support on the side thereof opposite from said source of X-rays and rotatable about a vertical axis parallel to that of said object support, said image recorder being adapted to preselect the desired plane or sections of the object to be radiographed by positioning the recorder in a "plane parallel" to that of the section desired, means operable to simultaneously rotate said object support and said image recorder with their rotation being so coordinated that an image of the preselected plane or sections of said object is cast by the source of X-rays on said recorder by intersection of the optical axis of said source of X-rays with the parallel axes of rotation of said object support and said recorder, which image remains stationary relative to the rotating recorder, and a grid positioned between said object and said image recorder to prevent secondary radiation striking said image recorder.

7. An X-ray apparatus for producing radiographs of a particular plane or simultaneously of a plurality of sections of an object comprising a source of X-rays, supporting means for the object to be radiographed disposed adjacent said source of X-rays and rotatable about a vertical axis, an image recorder disposed adjacent said object support on the side thereof opposite from said source of X-rays and rotatable about a vertical axis parallel to that of said object support, said image recorder being adapted to preselect the desired plane or sections of the object to be radiographed by positioning the recorder in a "plane parallel" to that of the section desired, mechanism operable to simultaneously rotate said object support and said image recorder with their rotation being so coordinated that an image of the preselected plane or sections of said object is cast by the source of X-rays on said recorder by intersection of the optical axis of said source of X-rays with the parallel axes of rotation of said object support and said recorder, which image remains stationary relative to the rotating recorder, and means for adjusting said image recorder relative to said object support without affecting the operation of said mechanism.

8. An X-ray apparatus for producing radiographs of a particular plane or simultaneously of a plurality of sections of an object comprising a source of X-rays, supporting means for the object to be radiographed disposed adjacent said source of X-rays and rotatable about a vertical axis, an image recorder disposed adjacent said object support on the side thereof opposite from said source of X-rays and rotatable about a vertical axis parallel to that of said object support, said image recorder being adapted to preselect the desired plane or sections of the object to be radiographed by positioning the recorder in a "plane parallel" to that of the section desired, mechanism operable to simultaneously rotate said object support and said image recorder with their rotation being so coordinated that an image of the preselected plane or sections of said object is cast by the source of X-rays on said recorder by intersection of the optical axis of said source of X-rays with the parallel axes of rotation of said object support and said recorder, which image remains stationary relative to the rotating recorder, and means operable upon rotation of said object support to cause the energization and de-energization of said source of X-rays.

WILLIAM WATSON.